(12) United States Patent
Kuhstrebe

(10) Patent No.: US 6,827,191 B2
(45) Date of Patent: Dec. 7, 2004

(54) CLUTCH SYSTEM WITH AT LEAST ONE MULTIPLE-PLATE CLUTCH ARRANGEMENT

(75) Inventor: Jochen Kuhstrebe, Biebelried/Westheim (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/317,828

(22) Filed: Dec. 12, 2002

(65) Prior Publication Data

US 2003/0116396 A1 Jun. 26, 2003

(30) Foreign Application Priority Data

Dec. 21, 2001 (DE) .......................... 101 63 404

(51) Int. Cl.[7] .............................................. F16D 21/06
(52) U.S. Cl. ................................ 192/48.92; 192/87.13; 192/87.15; 192/113.35; 74/339
(58) Field of Search ......................... 192/87.13, 87.14, 192/87.15, 113.35, 113.36, 48.92; 74/339

(56) References Cited

U.S. PATENT DOCUMENTS

| | | | | |
|---|---|---|---|---|
| 4,540,078 A | * | 9/1985 | Wetrich ................. | 192/113.36 |
| 4,640,401 A | * | 2/1987 | Koltookian ............ | 192/113.36 |
| 5,224,578 A | * | 7/1993 | Rheinheimer et al. ... | 192/113.1 |
| 5,890,392 A | | 4/1999 | Ludanek et al. ............. | 74/331 |
| 6,202,814 B1 | | 3/2001 | Braford, Jr. .............. | 192/70.12 |
| 6,206,163 B1 | * | 3/2001 | Schneider .............. | 192/113.35 |
| 6,454,074 B1 | | 9/2002 | Kundermann et al. ... | 192/87.11 |
| 6,464,059 B1 | | 10/2002 | Kundermann et al. ... | 192/87.11 |
| 6,615,966 B2 | * | 9/2003 | Kato ..................... | 192/113.35 |

FOREIGN PATENT DOCUMENTS

| | | | |
|---|---|---|---|
| DE | 100 04 189 | 4/2001 | ........... F16D/21/06 |
| DE | 100 04 190 | 4/2001 | ........... F16D/21/06 |
| DE | 100 04 195 | 4/2001 | ........... F16D/21/06 |

* cited by examiner

Primary Examiner—Saul Rodriguez
(74) Attorney, Agent, or Firm—Cohen, Pontani, Lieberman & Pavane

(57) ABSTRACT

A control unit associated with the cooling fluid supply switches the flow of cooling fluid on or off by controlling the cooling fluid supply in the course of a respective shifting process in which the transmission is shifted up from a lower gear to a higher gear or in down from a higher gear to a lower gear to deliberately exert inertial forces on at least one of the plate carriers by means of the flow of cooling fluid and, therefore, to act on this plate carrier in an accelerating or decelerating manner or in order to deliberately prevent inertial forces of this type being exerted on at least one of the plate carriers by the flow of cooling fluid.

17 Claims, 4 Drawing Sheets

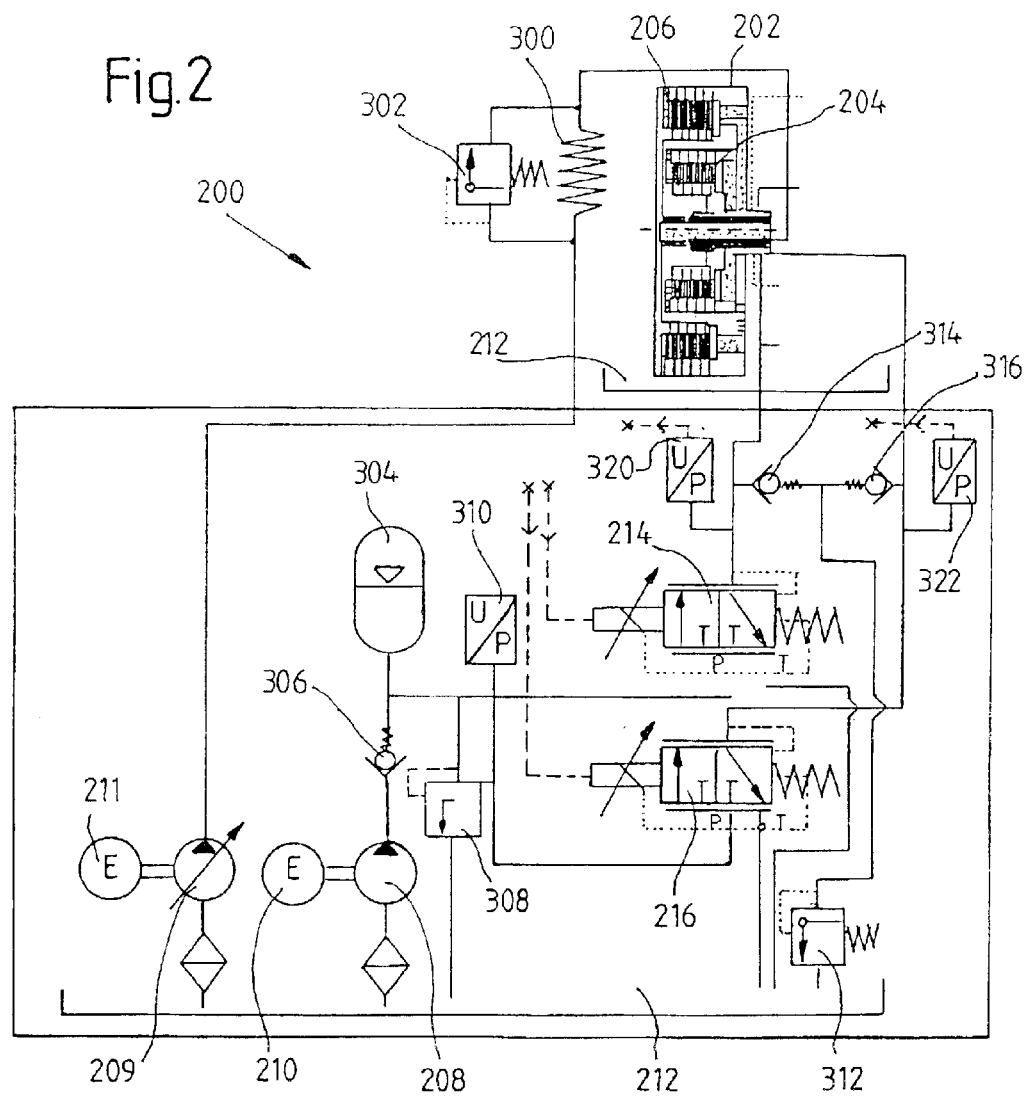
Fig.2
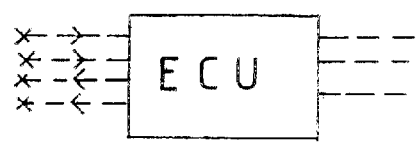

CLUTCH SYSTEM WITH AT LEAST ONE MULTIPLE-PLATE CLUTCH ARRANGEMENT

BACKGROUND OF THE INVENTION

1. Field of the Invention

The invention is directed to a clutch system with a clutch device for arrangement in a drivetrain of a motor vehicle for transmitting torque between a drive unit and a transmission having multiple speeds, the clutch device having at least one multiple-plate clutch arrangement which is associated with a transmission input shaft and which has an inner plate carrier, an outer plate carrier and a plate stack which is arranged between the inner plate carrier and the outer plate carrier. The multiple-plate clutch arrangement is provided for operating by the action of an operating fluid, and for this purpose the clutch system has an operating fluid supply by means of which at least one flow of operating fluid can be supplied to the plate stack from the radial inside of the inner plate carrier toward the radial outside or from the radial outside of the outer plate carrier toward the radial inside.

2. Description of the Related Art

A clutch system of this type is known, for example, from U.S. Pat. No. 6,464,059 and has a dual clutch device, also known as a double clutch, with a first multiple-plate clutch arrangement associated with a first transmission input shaft and a second multiple-plate clutch arrangement associated with a second transmission input shaft. The two multiple-plate clutch arrangements are arranged with their plate stacks and inner and outer plate carriers in the same axial area in such a way that a radial outer plate stack of one clutch arrangement encloses a radial inner plate stack of the other clutch arrangement on the radial outer side.

Operating fluid such as coolant oil must be supplied to the clutch arrangements particularly for slip operation in order to prevent overheating of the plates and possibly burning of the friction facings. In known plate stack constructions, the operating fluid is supplied proceeding from the radial inner side by means of a suitably constructed operating fluid supply which has at least one operating fluid pump (oil pump).

It is necessary to take stock of the energy required for providing the flow of operating fluid. For this reason, it is recommended that the flow of operating fluid be provided only when actually required by slip operation or the like. For this purpose, the present applicant has suggested constructions of the operating fluid supply in various patent applications. With regard to the supply of the flow of operating fluid and a hydraulic pressure medium used for actuation of the clutch arrangements (particularly a hydraulic oil which is also used as coolant oil), the suggested constructions especially favor the use of electrically driven pumps which make it possible to provide the flow of operating fluid and hydraulic pressure medium as needed in a simple manner. Heretofore, it has always been taken for granted that the flow of operating fluid must be minimized for purposes of energy efficiency with respect to the heat to be guided off from the clutch arrangements and that the flow of operating fluid must be initiated only in clutch states requiring the elimination of heat.

The synchronizing work to be performed when engaging gears is particularly important in dual clutches. The synchronizing work to be performed, which is comparatively extensive in such dual clutches under certain conditions, requires synchronizing devices which can sustain a comparatively high load and which are therefore expensive, insofar as an active synchronization by means of the clutch arrangements themselves is impossible. There is a need to relieve the synchronizing devices as far as possible so that the synchronizing work to be carried out is not performed by the synchronizing devices exclusively.

U.S. Pat. No. 5,890,392, for example, suggests providing friction wheels in a dual clutch transmission for active synchronization of the transmission shaft to be shifted. This represents considerable structural expenditure and is consequently cost-intensive.

SUMMARY OF THE INVENTION

According to the invention, the operating fluid supply is constructed in such a way that the flow of operating fluid, in particular the cooling fluid, can be switched on and off. A control unit is associated with the operating fluid supply to switch the flow of operating fluid on or off by controlling the operating fluid supply in a corresponding manner in the course of a shifting process in which the transmission is shifted up from a lower gear to a higher gear or down from a higher gear to a lower gear in order to deliberately exert inertial forces on at least one of the plate carriers by means of the flow of operating fluid and, accordingly, in order to act on this plate carrier in an accelerating or decelerating manner or in order to deliberately prevent inertial forces of this type being exerted on at least one of the plate carriers by the flow of operating fluid.

The inventive suggestion is based upon the consideration and the insight that during interaction between the flow of operating fluid and the plate carriers, the latter are acted upon by inertial forces which can reinforce the synchronization with respect to the gear to be engaged (and which to this extent can relieve the synchronizing devices of the transmission) or which can oppose the synchronization (and to this extent load the synchronizing devices of the transmission). Therefore, it is suggested that the flow of operating fluid be switched on and off deliberately in such a way that the synchronizing devices are relieved or are not additionally loaded.

The flow of operating fluid can be supplied to the plate stack from the radial inner side, as disclosed in U.S. Pat. No. 6,464,059. However, it is also possible to supply the flow of operating fluid to the plate stack from the radial outer side (see e.g. U.S. Pat. No. 6,202,814).

According to one embodiment of the invention, the control unit is preferably constructed for deliberately switching on the flow of operating fluid in the course of shifting the transmission up from a lower gear to a higher gear in order to exert inertial forces acting on at least one of the plate carriers for braking the latter for purposes of approximating a synchronizing speed associated with the higher gear.

According to another embodiment of the invention, the control unit is preferably constructed for deliberately switching off the flow of operating fluid in the course of shifting the transmission down from a higher gear to a lower gear in order to prevent inertial forces acting on at least one of the plate carriers for braking the latter for purposes of approximating a synchronizing speed associated with the lower gear.

As was already mentioned, the clutch device can be constructed as a dual clutch device or multiple clutch device and can have a first multiple-plate clutch arrangement associated with a first transmission input shaft and a second multiple-plate clutch arrangement associated with a second transmission input shaft. In contrast to the construction according to U.S. Pat. No. 6,464,059, the clutch arrangements can be arranged axially next to one another and the operating fluid supply has a first supply part associated with the first clutch arrangement and a second supply part which is associated with the second clutch arrangement. The first and second supply parts are controllable by the control unit independent from one another for deliberately switching on and switching off at least a first flow of operating medium allocated to the first clutch arrangement or at least a second flow of operating medium allocated to the second clutch arrangement. In this case, the two clutch arrangements can be regarded as completely independent from one another as regards the synchronizing work and the relief of the synchronizing units or prevention of additional loading of the synchronizing units by inertial forces exerted by the operating fluid.

On the other hand, when the clutch arrangements overlap axially, wherein a radial outer plate stack of one clutch arrangement encloses a radial inner plate stack of the other clutch arrangement on the radial outer side, and when the at least one flow of operating fluid passes the radial inner and radial outer plate stack, it can be taken into account at least when considered in more detail that the flow of operating fluid passes the two plate stacks one after the other. In so doing, the flow first interacts with the plate carriers of one clutch arrangement and then interacts with the plate carriers of the other clutch arrangement, depending on the construction of the plate carriers. In certain operating situations, the plate carriers of one clutch arrangement cause the flow of operating fluid to be accelerated in circumferential direction, and the interaction with the plate carriers of the other clutch arrangement depends upon this acceleration in circumferential direction.

However, as concerns the clutch arrangement whose plate carriers first interact with the flow of operating fluid, the situation respecting the relief of the synchronizing units and the prevention of additional loading of the synchronizing units is the same as in an axial side-by-side arrangement of the clutch arrangements.

Assuming that the flow of operating fluid can be supplied to the radial inner plate stack from the radial inner side, the control unit can be constructed for deliberately switching on the flow of operating fluid in the course of shifting up the transmission from a lower gear associated with the clutch arrangement with the radial outer plate stack to a higher gear associated with the clutch arrangement with the radial inner plate stack in order to exert inertial forces acting on at least one plate carrier of the clutch arrangement with the radial inner plate stack for braking the latter for purposes of approximating a synchronizing speed associated with the higher gear. It is further suggested that this control unit is constructed for deliberately switching off the flow of operating fluid in the course of shifting down the transmission from a higher gear associated with the clutch arrangement with the radial outer plate stack to a lower gear associated with the clutch arrangement with the radial inner plate stack in order to prevent inertial forces acting on at least one plate carrier of the clutch arrangement with the radial inner plate stack for braking the latter for purposes of approximating a synchronizing speed associated with the lower gear.

Further, to take into account the interaction of the flow of operating fluid with the radial outer plate stack and associated plate carriers also, the control unit can advantageously be constructed for deliberately switching on or switching off the flow of operating fluid in the course of shifting up the transmission from a lower gear associated with the clutch arrangement with the radial inner plate stack to a higher gear associated with the clutch arrangement with the radial outer plate stack in order to exert inertial forces acting on at least one plate carrier of the clutch arrangement with the radial outer plate stack so as to brake the latter or to prevent inertial forces acting so as to accelerate the latter for the purpose of approximating a synchronizing speed associated with the higher gear. Further, the control unit can advantageously be constructed for deliberately switching off or switching on the flow of operating fluid in the course of shifting down the transmission from a higher gear associated with the clutch arrangement with the radial inner plate stack to a lower gear associated with the clutch arrangement with the radial outer plate stack in order to prevent inertial forces acting on at least one plate carrier of the clutch arrangement with the radial outer plate stack so as to brake the latter or to exert inertial forces acting so as to accelerate the latter for the purpose of approximating a synchronizing speed associated with the lower gear.

The synchronizing work to be carried out generally depends on the speed-reducing or speed-increasing jump between gears. In this connection, it is suggested that the control unit is constructed so as to adjust the intensity of the at least one flow of operating fluid as a function of a speed-increasing or speed-reducing jump between gears.

It is particularly preferable that at least one of the plate carriers has application formations with application surfaces which extend in radial direction and interact with the flow of operating fluid. By constructing the plate carrier or plate carriers in this way, the inertial forces that can be exerted on the plate carrier or plate carriers by means of the at least one flow of operating fluid can be increased or maximized. In particular, the application formations can also be those not required, per se, for the functioning of the multiple-plate clutch arrangement. For example, the application formations can comprise blades which project radially inward from an inner plate carrier and/or blades which project radially outward from an outer plate carrier. However, constructions which are already provided in standard plate carriers and serve to drive the plates in rotation, for example, and which have surfaces or surface portions extending in radial direction must also be considered as application formations within a broader sense.

The invention is further directed to a motor vehicle drivetrain with a drive unit, a transmission and a clutch system according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 2 shows a detailed example of how a clutch system of the kind corresponding to FIG. 1 could be constructed for supplying coolant oil and hydraulic actuation of the clutch arrangements;

DETAILED DESCRIPTION OF THE PRESENTLY PREFERRED EMBODIMENTS

Figure 1:
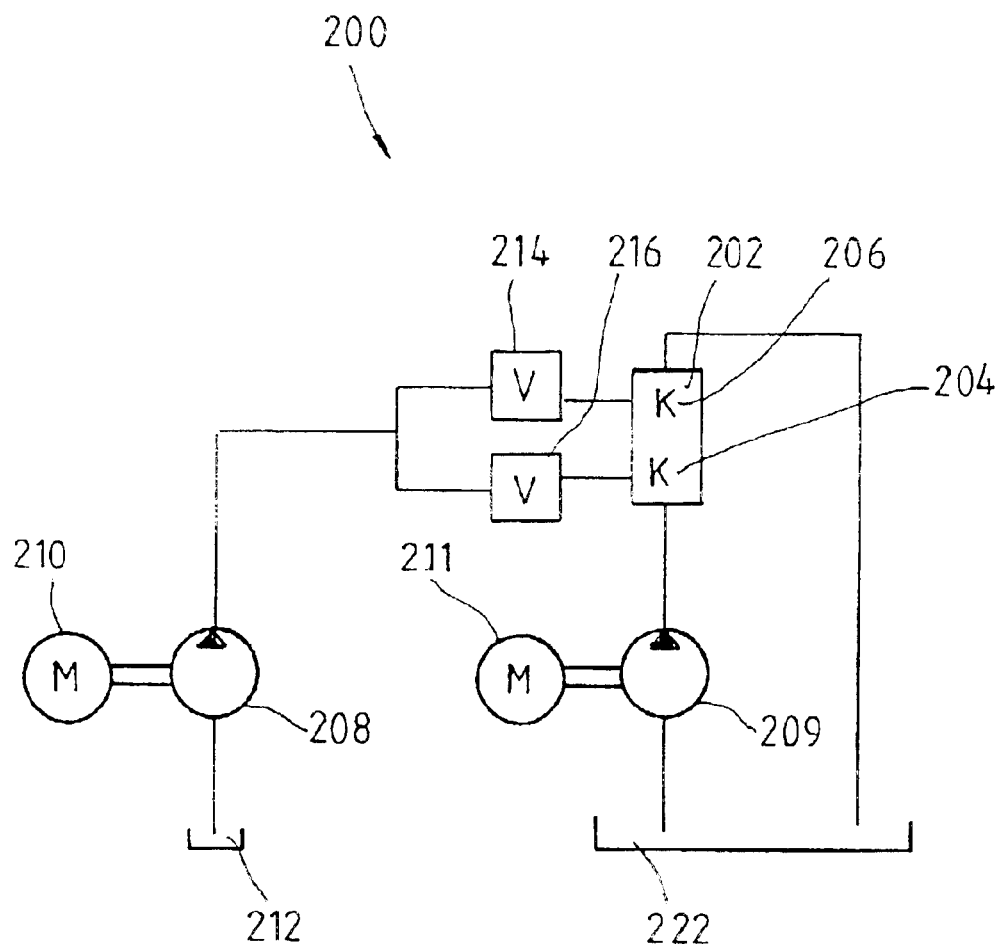
FIG. 1 is a schematic view which is given by way of example to illustrate a basic structure of a clutch system according to the invention with two multiple-plate wet clutch arrangements.

FIG. 1 is a schematic view of a clutch system 200 which has a dual wet clutch 202 with a first, radially outer clutch arrangement 206 and a second, radial inner clutch arrangement 204. The clutch arrangements 204 and 206 are multiple-plate wet clutch arrangements which, in a manner known per se, have at least one plate stack, are arranged radially one above the other in the present embodiment example and are each actuated by an associated actuation piston of a hydraulic slave cylinder which is integrated in the dual clutch.

The clutch system 200 has two independent pumps, namely, a first pump 208 and a second pump 209 which are preferably driven by an electric motor 210 and 211, respectively. The first pump 208 which is constructed as a hydrostatic pump or displacement machine, for example, provides pressure medium, particularly pressure oil, at a comparatively high pressure sufficient to actuate the clutch arrangements 204 and 206 of the dual clutch 202. For selective actuation of the clutch arrangements, each of these clutch arrangements, or more exactly their hydraulic slave cylinders, is connected to the pump 208 by an associated valve 214 and 216, respectively. The pump sucks pressure medium out of a reservoir 212.

The second pump 209 which is likewise constructed as a hydrostatic pump or displacement machine, for example, or, alternatively, as a hydrodynamic pump or turbomachine, provides a comparatively large volume flow of coolant medium, particularly coolant oil, which serves to cool the clutch arrangements 204 and 206. The pump 209 which can be switched on and off, as needed, by an associated control unit and whose pumping output can preferably be adjusted, sucks the cooling medium, possibly oil, from a reservoir 222. It should be mentioned that it is not mandatory for reservoir 222 to be separate from reservoir 212.

FIG. 2 shows how the clutch system shown in FIG. 1 can be constructed in detail. The coolant oil provided by the pump 209 is fed to the dual clutch 202 via a heat exchanger 300, so that the oil temperature is kept at a low enough level for cooling the dual clutch. A bypass valve 302 which is pretensioned by a spring, for example, allows coolant oil to flow past the oil cooler 300 to the dual clutch when the pressure increases above a threshold due to excessively low temperatures and corresponding viscousness of the oil, for example.

A pressure oil accumulator 304 having a gas cushion under pressure is built into the clutch actuation pressure oil circuit and is charged by the pump 208 through a non-return valve 306 and is connected to the actuating slave cylinders of the two clutch arrangements 204 and 206 via the control/regulating valves 214 and 216. The pressure oil accumulator 304 provides for a uniform pressure level and makes it possible for a pump with a relatively small pumping volume to be sufficient for use as a pump 208.

The pressure oil circuit between the non-return valve 306 and valves 214 and 216 is protected by a pressure limiting valve 308 to prevent excessive high pressure of the pressure oil which could possibly lead to damage. The pressure in this pressure oil circuit which is determined by the filling level of the accumulator 304 is detected by a pressure sensor 310. Another pressure limiting valve 312 ensures that the pressure which prevails on the other side of the valves 214 and 216 and which acts on the hydraulic slave cylinders of the clutch arrangements and accordingly determines the actuation state, of the clutch arrangements does not exceed a maximum value, for example, in order to prevent damage. When two non-return valves 314 and 316 are used, one pressure limiting valve is sufficient for monitoring the actuation pressure of both hydraulic slave cylinders in this respect.

The pressure levels prevailing on the other side of the control/regulating valves 214 and 216 are detected by a pressure sensor 320 and 322, respectively, which reports the detected pressure to an electronic control unit ECU in the form of an electric signal. The valves 214 and 216 are controlled by the ECU, specifically on the basis of the pressures detected by the sensors 320 and 322 and of at least one guide signal indicating a reference clutch actuation. The control unit ECU, valve 214 and pressure sensor 320 advantageously form a first control loop, and control unit ECU, valve 216 and pressure sensor 322 form a second control loop in order to provide a regulated actuation for both clutch arrangements 204 and 206.

Figure 3:
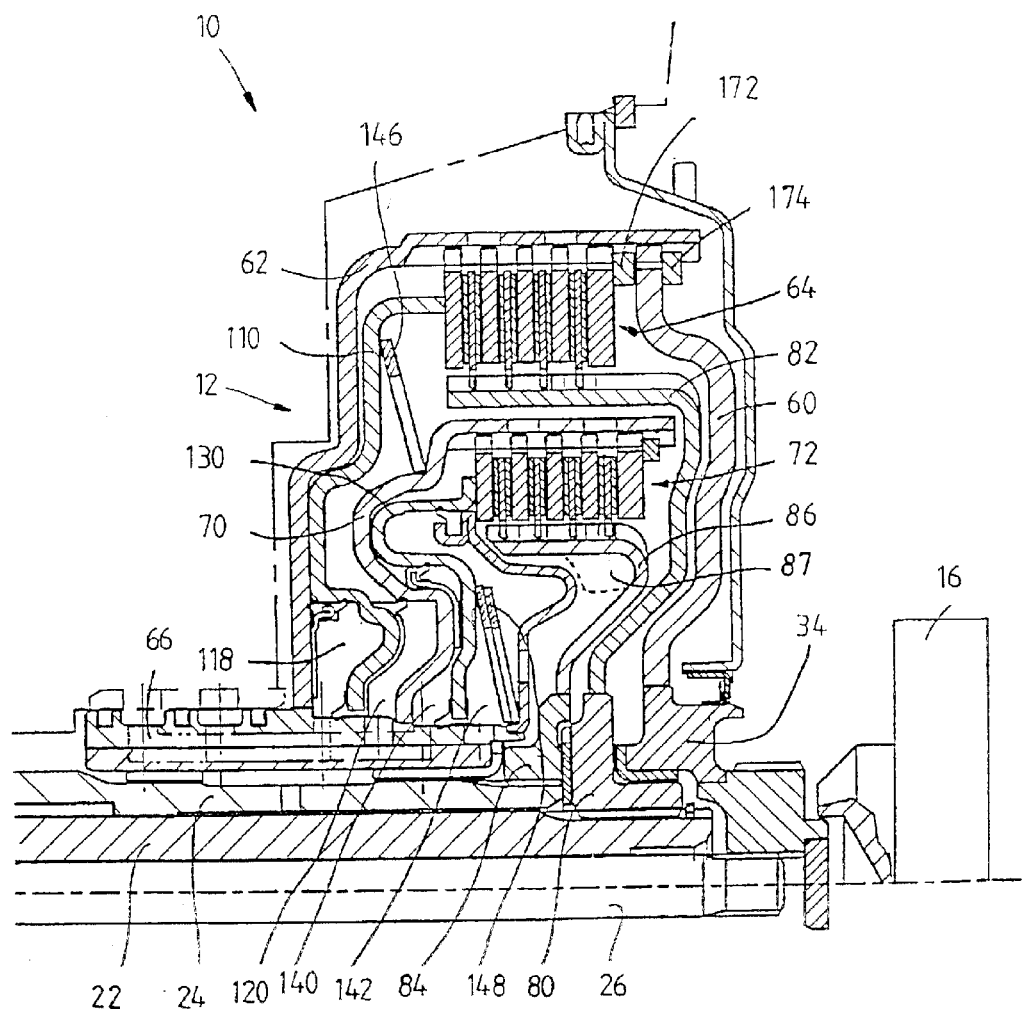
FIG. 3 shows an example for a dual clutch which is arranged in a drivetrain between a drive unit and a transmission and which has two radially nested multiple-plate clutch arrangements.

FIG. 3 shows an example of a dual clutch 12 which can be used as dual clutch 202. FIG. 3 shows the dual clutch 12 in its installed position in a drivetrain 10 between a drive unit and a transmission. Only one coupling end 16 of a driven shaft, possibly a crankshaft, of the drive unit, e.g., an internal combustion engine, is shown in FIG. 3. An input hub 34 of the dual clutch 12 communicates with the coupling end 16 so as to transmit torque by way of a torsional vibration damper arrangement, not shown. Two transmission input shafts 22 and 24 of the transmission are shown, an inner plate carrier 82 and 86 of a radial outer multiple-plate clutch arrangement 64 and a radial inner multiple-plate clutch arrangement 72, respectively, being arranged at the transmission input shafts 22 and 24 via hubs 80 and 84 so as to be fixed with respect to rotation relative to them. An outer plate carrier 62 of the radial outer multiple-plate clutch arrangement and an outer plate carrier 70 of the radial inner multiple-plate clutch arrangement are connected via a coupling member 60 and a ring or sleeve part 66, respectively, so as to be fixed with respect to relative rotation. The outer plate carriers serve as the input side of the respective multiple-plate clutch arrangement and the inner plate carriers serve as the output side of the respective multiple-plate clutch arrangement. The multiple-plate clutch arrangements can be actuated for engagement via a hydraulic slave cylinder 118 and 140, respectively, by an actuating piston 110 and 130, respectively. The hydraulic slave cylinders 118 and 140 are connected via ducts in the ring part 66 to hydraulic master cylinders or control/regulating valves or the like. A plate spring arrangement 146 and 148 is associated with the actuating piston for releasing the multiple-plate clutch arrangements. An oil pump drive shaft 26 extends through the transmission input shafts 22 and 24, and the oil pump provides coolant oil for supplying to the plate stacks of the clutch arrangements 64 and 72 and the centrifugal force pressure compensation chambers 120 and 142. The coolant oil is supplied through channels between the ring part 66 and the transmission input shaft 24 and between the transmission input shafts.

The dual clutch construction shown in FIG. 3 corresponds essentially (apart from certain changes which are not relevant in the present context) to a dual clutch construction that is described in various publications by the present applicant. Reference is had particularly to U.S. Pat. No. 6,464,059, U.S. Pat. No. 6,454,074, U.S. Pat. No. 6,499,578, U.S. Pat. No. 6,491,149 and U.S. Pat. No. 6,523,657, whose contents are incorporated by reference in the disclosure of the present application. FIG. 3 of the present application corresponds substantially to FIG. 1 of the series of patents belonging to this patent family and the same reference numbers are used in both Figures for structural component parts which correspond to one another.

According to a conventional approach, coolant oil is supplied to the clutch arrangements only when it is required for reasons of temperature due to corresponding clutch states, e.g., slip states of the clutch. For this purpose, the electronic control unit shown in FIG. 2 can switch the pump 209 and its electric motor 211 on and off as needed and in doing so can advantageously regulate or control the flow of coolant oil in such a way that the amount of coolant oil supplied per unit of time is just sufficient for carrying off the heat caused by friction at the plates.

According to the invention, the control unit is designed alternatively or additionally to switch the coolant oil supply on and off deliberately in connection with shifting processes in which the transmission is shifted between a starting gear and a target gear and possibly so as to vary the amount of coolant oil supplied per time unit depending on the gears or speeds in question. This reduces the synchronizing work to be applied in the transmission by synchronizing units through inertial forces exerted on a respective clutch arrangement by means of the coolant oil or at least does not increase the synchronizing work to be applied by the synchronizing units through inertial forces of this kind. The control unit accomplishes this through appropriate control, particularly by appropriate switching on and switching off, of the pump 209 or electric motor 211 controlling the pump. The carrying off of friction heat from the plate stacks is preferably primarily taken into account in the corresponding control/regulating algorithm, which is implemented, for example, by means of software, to the extent that excessive thermal loading of the clutch arrangements, particularly of their plates, must be prevented in every case. In the event of a conflict regarding the target of cooling, required per se, and synchronizing work which is to be minimized per se by switching off the flow of coolant oil or keeping it to a minimum, the cooling proceeds at least to the extent that sufficient minimum cooling is ensured.

Figure 4:
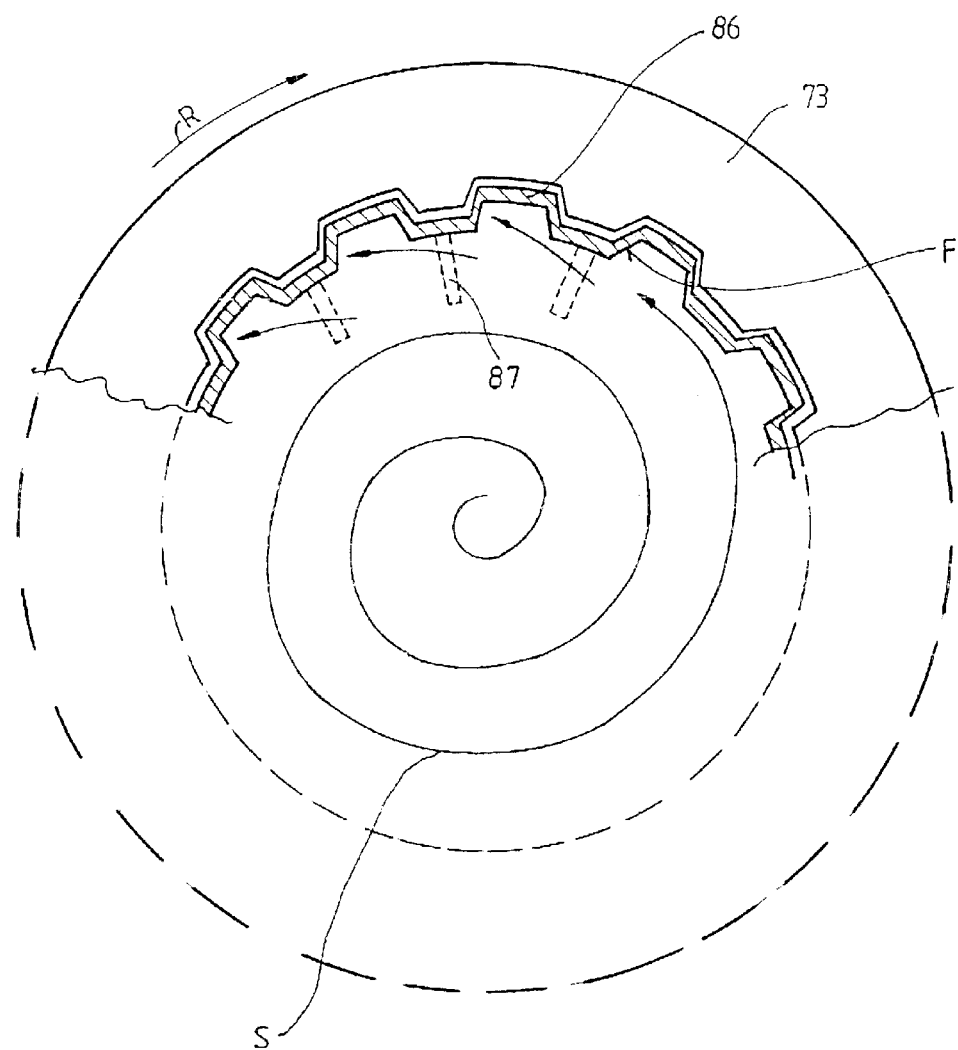
FIG. 4 shows an axial view of an inner plate carrier, shown in section, including an inner plate arranged at the latter, and serves to illustrate an inertial interaction between the inner plate carrier and coolant oil which is supplied from the radial inner side.

The invention is based on the physical effect whereby inertial forces connected with so-called Coriolis force are exerted on the clutch arrangements, particularly on their plate carriers, during interaction between the coolant oil and the clutch arrangements. For example, assuming that the coolant oil is supplied from the radial inner side toward the radial outer side corresponding to the example in FIG. 3, then, due to Coriolis force with respect to the rotating plate carriers, particularly the rotating inner plate carriers, a spiral path of the oil opposed to the rotating direction of the clutch arrangements occurs relative to these rotating plate carriers. In this connection, reference is had to FIG. 4 in which the inner plate carrier 86, including an inner plate 73 of the radial inner clutch arrangement, is shown schematically. The rotating direction of the dual clutch and therefore the rotating direction of the inner plate carrier 86 is indicated by arrow R. The spiral path of the coolant oil which is supplied from the radial inner side is designated by S in a coordinate system rotating along with the dual clutch. As can be seen, the flow direction of the oil relative to the plate carrier has a component opposed to the rotating direction of the plate carrier.

Conventional plate carriers generally have circumferential teeth so that the plates, which are likewise provided with teeth, can be received so as to be fixed with respect to relative rotation. The teeth defines surfaces F which extend in radial direction. The coolant oil strikes these surfaces, so that inertial forces which have a braking effect are exerted on the plate carriers. It was realized that these inertial forces, or inertial forces of this kind, can be used in a deliberate manner for relieving the synchronizing unit of the transmission for defined shifting processes and, on the other hand, that these inertial forces or inertial forces of this kind can even increase the synchronizing work for the synchronizing units for defined shifting processes and should then be prevented as far as possible.

Assuming, as has been the basis of the preceding considerations, that the coolant oil is guided from the radial inner side to the radial outer side, the braking action which relieves the synchronizing units can be achieved when shifting the transmission up from a lower gear to a higher gear, and a particularly great effect can be achieved when the lower starting gear (first gear, for instance) is associated with the transmission input shaft connected to the radial outer clutch arrangement and, consequently, the higher gear is associated with the transmission input shaft connected to the radial inner clutch arrangement.

This can be illustrated based on the following example. Both clutch arrangements are closed prior to shifting up. Both clutch arrangements and accordingly both transmission input shafts then rotate at the speed of the drive unit (engine speed). A gear is engaged only on the transmission shaft of the load-transmitting clutch arrangement (for example, the radial outer clutch arrangement). Due to the fact that both clutch arrangements are closed, the clutch arrangement which does not transmit a load rotates at the same speed as the load-transmitting clutch arrangement.

When shifting up, a higher gear than that gear currently transmitting load is engaged on the free transmission input shaft associated, for example, with the radial inner clutch arrangement. For this purpose, the transmission input shaft must be braked in order to achieve the synchronizing speed. This braking is conventionally carried out solely by means of the synchronizing device of the transmission. According to the invention, the coolant oil supply is activated in the course of the shifting process so that the inertial forces connected with Coriolis force act on the clutch arrangement associated with the target gear, particularly on its inner plate carrier. In the present example, the radial inner clutch arrangement is associated with the target gear. The supplied coolant oil interacts with the inner plate carrier 86 in the manner described in connection with FIG. 4, namely, so as to brake the plate carrier.

When the clutch which is not transmitting any load for the moment is opened prior to shifting up and no gear is engaged on the transmission input shaft associated with this clutch arrangement, it must be assumed that the speed of this transmission input shaft and therefore at least the output side of the clutch arrangement connected with it does not differ substantially from the engine speed. Therefore, for the purpose of engaging the higher gear on the free transmission input shaft, the transmission input shaft must also be braked in order to achieve the synchronizing speed. This results in substantially the same situation as that described above.

To increase or maximize the braking effect, the plate carriers or at least the inner plate carrier 86 of the radial inner clutch arrangement can be constructed with special interaction surfaces which offer the flow of coolant oil a large interaction surface. Corresponding interaction blades 87 which project radially inward from the plate holding portion of the inner plate carrier 86 are shown in dashed lines in FIGS. 3 and 4. These blades 87 have the additional effect of retaining the coolant oil which is supplied from the radial inner side and conducting it through openings of the inner plate carrier into the plate stack.

The braking moment exerted by the coolant oil due to the inertial interaction depends upon the amount of coolant oil supplied per unit of time, that is, upon the flow of coolant oil. Further, the synchronizing work to be performed depends upon the jump between the starting gear and the target gear and is generally highest when shifting up from first gear to the second gear. The control unit can be constructed so as to adapt the flow of coolant oil to the jump between gears.

The possibility of the first gear being allocated to the transmission input shaft connected to the radial outer clutch arrangement has already been mentioned. This allocation is particularly reasonable in that in the case of nested clutch arrangements the braking action of the coolant oil is greater at the radial inner clutch arrangement than at the radial outer clutch arrangement because of the larger free radial flow distance. Accordingly, the particularly extensive synchronizing work when shifting up from first gear to second gear can be applied to an especially great extent based on the braking action of the coolant oil.

The type of synchronization described above and the reinforcement of the synchronization described above can be carried out simultaneously or prior to the synchronization by the synchronizing units of the transmission.

When shifting back from a higher gear to a lower gear, the transmission input shaft associated with the target gear must be accelerated beyond the speed level of the transmission input shaft which is currently transmitting load. Assuming that the coolant oil is guided from the radial inner side to the radial outer side, as has been taken as a basis for the preceding description, the inertial interaction between the clutch arrangements and the coolant oil opposes the acceleration of the transmission input shaft associated with the target gear to approximate the synchronizing speed. For this reason, the control unit is designed within the framework of requirements for a minimum cooling during synchronization to switch off the supply of coolant oil or to switch off the flow of coolant oil or at least to reduce the supply of coolant oil to a minimum supply of coolant oil, so that, as far as possible, the synchronizing device of the transmission is not additionally loaded.

It was assumed in the preceding that coolant oil is supplied from the radial inner side to the radial outer side. But it is also possible to supply the coolant oil from the radial outer side and carry it away from the radial inner side. When the supply is carried out from stationary supply openings, the inertial interaction with a rotating plate carrier acts so as to brake the plate carrier. Therefore, in case of radially nested plate arrangements, a braking action can be achieved with respect to the radial outer clutch arrangement in a manner corresponding to that described above. In particular, when the coolant oil is guided in this way, it is possible to construct the outer plate carriers with interaction blades.

Due to the interaction mentioned above, a rotational movement is imparted to the coolant oil, so that the coolant oil advances beyond the speed of the engine as it continues toward the radial inner side. Therefore, during interaction with the radial inner clutch arrangement, inertial forces acting to accelerate the clutch arrangement or its plate carriers could be exerted on the latter, in principle, at least in many operating states. It is possible to utilize this effect for downshifting in order to reduce the synchronizing work to be performed by the synchronizing device.

The inventive suggestion can also be applied in clutch devices with only one multiple-plate clutch arrangement and in clutch devices with a plurality of clutch arrangements which are arranged axially one next to the other. In the latter case, approximately the same braking action is achieved for both clutch arrangements and their inner plate carriers and/or outer plate carriers due to Coriolis force.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A clutch system for a drive train of a motor vehicle, said clutch system comprising:

a clutch device for transmitting torque between a drive unit and a transmission having an input shaft and multiple speeds, said transmission having gears and synchronizing units which match speeds of the starting gear and a target gear during shifting, said clutch device comprising a multiple-plate clutch arrangement associated with said input shaft and having an inner plate carrier, an outer plate carrier, and a plate stack arranged between said inner plate carrier and said outer plate carrier, said inner plate carrier having a radial inside, said outer plate carrier having a radial outside;

means for supplying a flow of cooling fluid to said plate stack from one of said radial inside toward said radial outside and said radial outside toward said radial inside, and an electronic control unit for switching said flow of cooling fluid on and off during shifting so that inertial forces are one of exerted on at least one of said plate carriers by said flow of cooling fluid and prevented from being exerted on at least one of said plate carriers by said flow of cooling fluid, and so that loading of synchronizing units is reduced during shifting from a starting gear to a target gear.

2. A clutch system as in claim 1 wherein said flow of cooling fluid is supplied from said radial inside to said radial outside of said inner plate carrier.

3. A clutch system as in claim 1 wherein said flow of cooling fluid is supplied from said radial outside to said radial inside of said outer plate carrier.

4. A clutch system as in claim 1 wherein said control unit switches on said flow of cooling fluid during shifting up from a lower gear to a higher gear in order to exert inertial forces on at least one of said plate carriers for braking said at least one of said plate carriers, whereby a synchronizing speed associated with the higher gear can be approximated.

5. A clutch system as in claim 1 wherein said control unit switches off said flow of cooling fluid during shifting down from a higher gear to a lower gear in order to prevent inertial forces from acting on at least one of said plate carriers for braking said at least one of said plate carriers, whereby a synchronizing speed associated with the lower gear can be approximated.

6. A clutch system as in claim 1 wherein said clutch device is a multiple clutch device for transmitting torque to a transmission having first and second input shafts, said clutch device comprising a first multiple-plate clutch arrangement associated with said first input shaft and a second multiple-plate clutch arrangement associated with said second input shaft.

7. A clutch system as in claim 6 wherein
said first and second clutch arrangements are arranged coaxially,
said system further comprising means for supplying an operating medium comprising a first supply part which supplies a first flow of operating medium to said first multiple-plate clutch arrangement and a second supply part which supplies a second flow of operating medium to said second multiple-plate clutch arrangement, and
said control unit controlling said first and second supply parts independently from one another for switching on and off said first and second flows of operating medium.

8. A clutch system as in claim 6 wherein said first and second clutch arrangements are arranged concentrically, said first clutch arrangement having a radial outer plate stack, said second clutch arrangement having a radial inner plate stack, said flow of cooling fluid passing said inner plate stack and said outer plate stack.

9. A clutch system as in claim 8 wherein said flow of cooling fluid can be supplied to said radial inner plate carrier from the radial inside.

10. A clutch system as in claim 9 wherein said control unit switches on said flow of cooling fluid during shifting up from a lower gear associated with the first clutch arrangement to a higher gear associated with the second clutch arrangement in order to exert inertial forces on at least one of said plate carriers of said second clutch arrangement for braking said at least one of said plate carriers, whereby a synchronizing speed associated with the higher gear can be approximated.

11. A clutch system as in claim 9 wherein said control unit switches off said flow of cooling fluid during shifting down from a higher gear associated with the first clutch arrangement to a lower gear associated with the second clutch arrangement in order to prevent inertial forces from acting on at least one of said plate carriers of said second clutch arrangement for braking said at least one of said plate carriers, whereby a synchronizing speed associated with the lower gear can be approximated.

12. A clutch system as in claim 9 wherein said control unit switches on or off said flow of cooling fluid during shifting up from a lower gear associated with the second clutch arrangement to a higher gear associated with the first clutch arrangement in order to exert inertial forces on at least one of said plate carriers of said first clutch arrangement for braking or accelerating said at least one of said plate carriers, whereby a synchronizing speed associated with the higher gear can be approximated.

13. A clutch system as in claim 9 wherein said control unit switches off or on said flow of cooling fluid during shifting down from a higher gear associated with the second clutch arrangement to a lower gear associated with the first clutch arrangement in order to prevent inertial forces from acting on at least one of said plate carriers of said first clutch arrangement for braking said at least one of said plate carriers or to exert axial forces on said at least one of said plate carriers for accelerating said at least one of said plate carriers, whereby a synchronizing speed associated with the lower gear can be approximated.

14. A clutch system as in claim 1 wherein said control unit can adjust the intensity of said flow of cooling fluid as a function of one of a speed-increasing and a speed-reducing jump between gears.

15. A clutch system as in claim 1 wherein at least one of said plate carriers comprises radially extending application surfaces which interact with the flow of cooling fluid.

16. A clutch system as in claim 15 comprising blades extending one of radially inward from said inner plate carrier and radially outward from said outer plate carrier, said application surfaces being on said blades.

17. A drive train of a motor vehicle, said drive train comprising a drive unit, a transmission, and a clutch system, the transmission having gears and synchronizing units which match speeds of a starting gear and a target gear during shifting, said clutch system comprising:

a clutch device for transmitting torque between a drive unit and a transmission having an input shaft and multiple speeds, said clutch device comprising a multiple-plate clutch arrangement associated with said input shaft and having an inner plate carrier, an outer plate carrier, and a plate stack arranged between said inner plate carrier and said outer plate carrier, said inner plate carrier having a radial inside, said outer plate carrier having a radial outside;

means for supplying flow of cooling fluid to said plate stack from one of said radial inside toward said radial outside and said radial outside toward said radial inside, and an electronic control unit for switching said flow of cooling fluid on and off during shifting so that inertial forces are one of exerted on at least one of said plate carriers by said flow of cooling fluid and prevented from being exerted on at least one of said plate carriers by said flow of cooling fluid, and so that loading of synchronizing units is reduced during shifting from a starting gear to a target gear.

* * * * *